United States Patent
Doan et al.

(10) Patent No.: US 10,248,439 B2
(45) Date of Patent: Apr. 2, 2019

(54) FORMAT OBJECT TASK PANE

(75) Inventors: Christopher Doan, Redmond, WA (US); Megan Ann Bates, Kirkland, WA (US); Diana Gail Kimball, Boston, MA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/293,999

(22) Filed: Nov. 10, 2011

(65) Prior Publication Data
US 2013/0125041 A1 May 16, 2013

(51) Int. Cl.
G06F 9/44 (2018.01)
G06F 9/451 (2018.01)

(52) U.S. Cl.
CPC .............. G06F 9/451 (2018.02); G06F 9/44 (2013.01)

(58) Field of Classification Search
CPC ............ G06F 9/44; G06F 9/434; G06F 9/451
USPC ........................................................ 715/781
See application file for complete search history.

(56) References Cited

U.S. PATENT DOCUMENTS

| | | | | |
|---|---|---|---|---|
| 5,040,131 A | * | 8/1991 | Torres | G06F 3/0481 715/210 |
| 5,581,670 A | * | 12/1996 | Bier | G06F 3/0481 345/629 |
| 6,118,451 A | * | 9/2000 | Alexander | G06F 3/0481 715/809 |
| 6,118,939 A | * | 9/2000 | Nack et al. | 717/109 |
| 6,133,915 A | * | 10/2000 | Arcuri | G06F 3/0481 715/779 |
| 6,239,796 B1 | * | 5/2001 | Alexander | G06F 3/0481 715/781 |
| 6,239,798 B1 | * | 5/2001 | Ludolph et al. | 715/788 |
| 6,473,103 B1 | * | 10/2002 | Bailey | G09G 5/14 715/764 |
| 6,583,798 B1 | * | 6/2003 | Hoek et al. | 715/822 |
| 6,686,938 B1 | * | 2/2004 | Jobs et al. | 715/835 |
| 6,931,416 B2 | | 8/2005 | Kelley et al. | 707/102 |
| 7,103,853 B1 | * | 9/2006 | Patil | G06F 3/0481 715/744 |
| 7,496,829 B2 | | 2/2009 | Rubin et al. | 715/203 |

(Continued)

FOREIGN PATENT DOCUMENTS

CN 101702126 A 5/2010

OTHER PUBLICATIONS

Faithe Wempen, "Microsoft PowerPoint 2010 Bible", Mar. 2010, Wiley Publishing, Inc., pp. 1-820.*

(Continued)

Primary Examiner — Nicholas Klicos
(74) Attorney, Agent, or Firm — Merchant & Gould

(57) ABSTRACT

A format object task pane is provided that presents contextual formatting controls for formatting objects. The format object task pane may be docked to an edge of an application window and may be modeless, allowing a user to interact with application functionalities while the task pane is open. Formatting controls may behave contextually and display controls specific to a currently selected object. The presented formatting controls may be organized by categories and by sections within the categories. Text formatting and object formatting controls may be provided in a same task pane.

18 Claims, 9 Drawing Sheets

(56) References Cited

U.S. PATENT DOCUMENTS

| | | | | |
|---|---|---|---|---|
| 7,516,406 | B1* | 4/2009 | Cameron | G06F 8/34 715/710 |
| 7,614,016 | B2 | 11/2009 | Wong et al. | 715/854 |
| 7,703,036 | B2 | 4/2010 | Satterfield et al. | 715/777 |
| 7,721,225 | B2* | 5/2010 | Montroy | G06F 17/3089 715/234 |
| 2002/0124255 | A1* | 9/2002 | Reichardt et al. | 725/42 |
| 2003/0011639 | A1* | 1/2003 | Webb | 345/808 |
| 2003/0210274 | A1* | 11/2003 | Subramanian et al. | 345/809 |
| 2004/0113951 | A1* | 6/2004 | Brockway | G06F 9/451 715/811 |
| 2005/0120308 | A1* | 6/2005 | Gibson | G06F 9/4443 715/779 |
| 2005/0188307 | A1* | 8/2005 | Bailey et al. | 715/531 |
| 2005/0289478 | A1 | 12/2005 | Landman et al. | |
| 2006/0036568 | A1* | 2/2006 | Moore | G06F 17/30126 |
| 2006/0036945 | A1* | 2/2006 | Radtke | G06F 9/451 715/708 |
| 2006/0036946 | A1* | 2/2006 | Radtke | G06F 3/0481 715/711 |
| 2006/0036950 | A1* | 2/2006 | Himberger et al. | 715/732 |
| 2006/0184898 | A1* | 8/2006 | Kern | G06F 3/04817 715/810 |
| 2006/0200780 | A1* | 9/2006 | Iwema | G06F 3/0488 715/810 |
| 2006/0236253 | A1* | 10/2006 | Gusmorino et al. | 715/762 |
| 2006/0271869 | A1* | 11/2006 | Thanu et al. | 715/764 |
| 2007/0055943 | A1* | 3/2007 | McCormack | G06F 3/0481 715/746 |
| 2007/0168873 | A1* | 7/2007 | Lentz | G06F 3/0482 715/763 |
| 2007/0226650 | A1* | 9/2007 | Hintermeister | G06F 3/048 715/822 |
| 2007/0252851 | A1* | 11/2007 | Ogata et al. | 345/619 |
| 2008/0016459 | A1* | 1/2008 | Mann | G06F 1/3203 715/781 |
| 2008/0104525 | A1* | 5/2008 | Wolber et al. | 715/763 |
| 2008/0235618 | A1* | 9/2008 | Sadouski | 715/788 |
| 2008/0244440 | A1* | 10/2008 | Bailey et al. | 715/777 |
| 2008/0282166 | A1* | 11/2008 | Fillman et al. | 715/719 |
| 2008/0282170 | A1* | 11/2008 | Arend et al. | 715/733 |
| 2009/0006939 | A1* | 1/2009 | DeSpain et al. | 715/217 |
| 2010/0058216 | A1* | 3/2010 | Yoon | G06F 3/0482 715/769 |
| 2010/0107062 | A1* | 4/2010 | Bacus et al. | 715/269 |
| 2010/0121614 | A1* | 5/2010 | Reghetti et al. | 703/1 |
| 2010/0138762 | A1* | 6/2010 | Reghetti et al. | 715/765 |
| 2010/0218100 | A1* | 8/2010 | Simon et al. | 715/731 |
| 2010/0229110 | A1* | 9/2010 | Rockey et al. | 715/760 |
| 2011/0295852 | A1* | 12/2011 | Wang et al. | 707/728 |
| 2012/0054653 | A1* | 3/2012 | Grossman et al. | 715/764 |
| 2012/0084693 | A1* | 4/2012 | Sirpal | G06F 1/1616 715/769 |
| 2012/0124515 | A1* | 5/2012 | Li | G06F 3/0482 715/808 |
| 2012/0159375 | A1* | 6/2012 | Shaw | G06F 3/0483 715/777 |
| 2013/0019173 | A1* | 1/2013 | Kotler | G06F 3/0482 715/711 |
| 2013/0019182 | A1* | 1/2013 | Gil | G06F 3/0482 715/738 |
| 2014/0040859 | A1* | 2/2014 | Jaramillo | 717/113 |

OTHER PUBLICATIONS

OpenOffice Impress. Linuxtopia. *Using slide animation effects.* Retrieved Jul. 27, 2011. http://www.linuxtopia.org/online_books/office_guides/openoffice_impress_guide/openoffice_impress_Using_slide_animation_effects.html. pp. 6.

Feature Visibility [Enterprise Architect User Guide]. *Feature Visibil.* Retrieved Jul. 27, 2011. http://www.sparxsystems.com/uml_tool_guide/modeling/setfeaturevisibility.htm. pp. 3.

Layers task pane. *Expression Studio 2.0.* Retrieved Jul. 27, 2011. http://msdn.microsoft.com/en-us/library/cc294845.aspx. pp. 3.

"First Office Action and Search Report Received for Chinese Patent Application No. 201210447973.0", dated Dec. 29, 2014, 14 Pages.

"Second Office Action Issued in Chinese Patent Application No. 201210447973.0", dated Aug. 5, 2015, 7 Pages.

"Third Office Action Issued in Chinese Patent Application No. 201210447973.0", dated Oct. 30, 2015, 7 Pages.

* cited by examiner

MOBILE COMPUTING DEVICE

FORMAT OBJECT TASK PANE

BACKGROUND

Many application programs are offered for providing functionalities for creating and editing documents, spreadsheets, presentations, etc. Such application programs oftentimes provide features for allowing users to add and customize objects such as shapes, pictures, charts, and diagrams within a document. Typically, controls for such features are presented in a dialog that may obstruct the usable workspace on a user's display. As more controls are offered for making adjustments to objects, these controls may be added within the dialog, making the dialog progressively larger and more complex. The quantity and variety of controls provided in an object formatting dialog may be vast and somewhat unwieldy.

It is with respect to these and other considerations that the present invention has been made.

SUMMARY

Embodiments of the present invention solve the above and other problems by providing contextual formatting controls in a modeless format object task pane. According to embodiments, upon receiving an indication of a selection of a formatting functionality associated with an object, formatting controls associated with the formatting the object may be provided in a format object task pane. The formatting controls may be organized by categories and by sections within the categories. Formatting controls may be grouped together according to common tasks and workflows. Both object and text formatting controls may be provided in a format object task pane. The format object task pane may be modeless, wherein a user may switch between the format object task pane and application functionalities without having to close and relaunch the format object task pane. The format object task pane may be docked to an edge of an application window so that it does not block content that a user may be editing. Upon receiving an indication of a selection of a formatting functionality associated with a second object, the format object task pane may be automatically updated with formatting controls associated with the formatting the second object.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
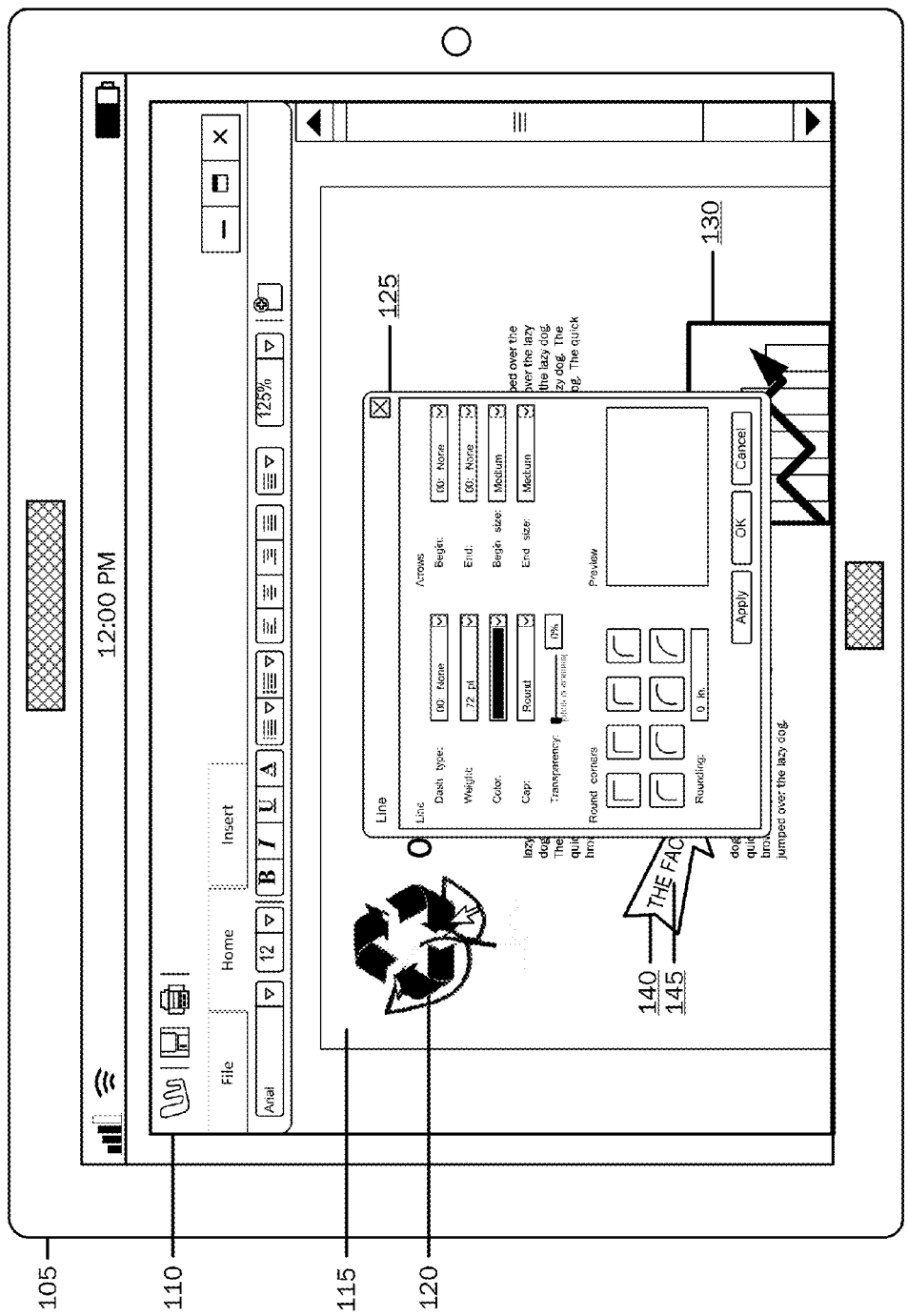
FIG. 1 is an illustration of a formatting object dialog displayed over a document.

As briefly described above, embodiments of the present invention are directed to providing contextual formatting controls in a modeless format object task pane. According to embodiments, upon receiving an indication of a selection of a formatting functionality associated with an object, formatting controls associated with the formatting the object may be provided in a format object task pane.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As described briefly above, currently in application programs, functionalities for adding, formatting, and customizing objects such as shapes, pictures, charts, and diagrams within a document are oftentimes provided in a dialog that may obstruct the usable workspace on a user's display.

Referring now to FIG. 1, an example of a dialog 125 is illustrated displayed over a document 115. As can be seen, an application program window 110 is illustrated displayed on a screen of a computing device, such as a tablet computing device 105. The application program window 110 is illustrated with a document 115 displayed in the workspace. The application program may be one of various application programs such as, but not limited to, word processing applications, spreadsheet applications, presentation applications, computer aided drafting applications, etc. The document 115 may contain one or more objects 120,130,140. As illustrated in FIG. 1, a document may contain a picture 120, a chart 130, a shape 140, or other objects. With current designs, when a formatting dialog is launched via one of various methods, a dialog 125 may be displayed disposed over the document 115. The dialog 125 may be modal or modeless, and may occupy screen real estate. Oftentimes, the modal dialog 125 may obscure the document workspace and may obscure the object 120,130,140 a user intends to format.

Some current formatting dialogs 125 may require a user to relaunch a formatting dialog upon selection of a different object 120,130,140. For example, if a user wanted to edit shape properties of an object 140, the user may launch a format object dialog; however, to edit text properties of text 145 on the object 140, the user may be required to relaunch the same dialog but from a different entry point.

Figure 2:
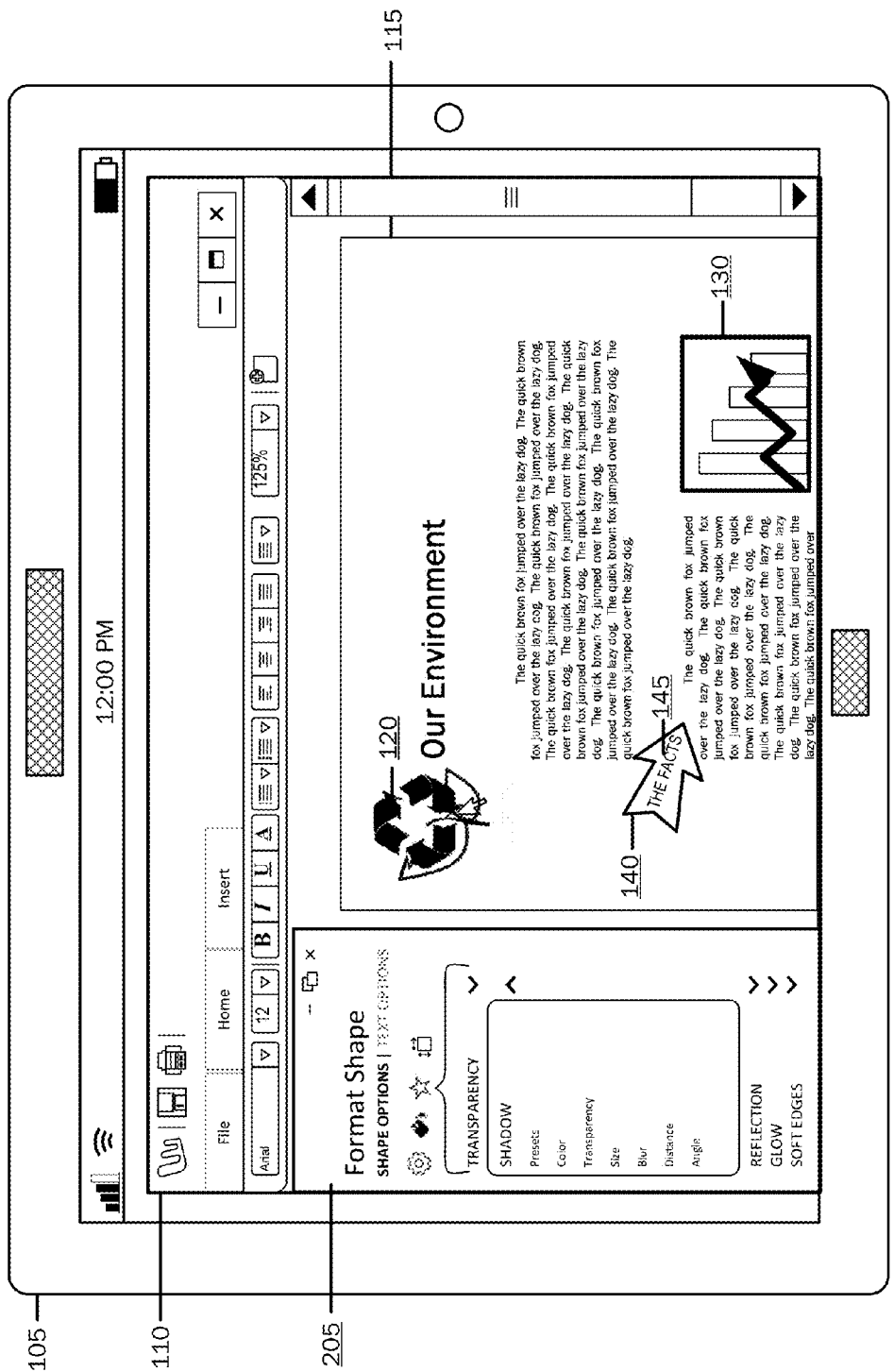
FIG. 2 is an illustration of a format object task pane in an application window.

Embodiments of the present invention provide formatting controls within a modeless task pane. Embodiments allow for a user to interact with an application and objects in a document 115 while the task pane is open. The format object task pane may behave contextually and may surface controls specific to a currently selected object 120. Referring now to FIG. 2, an example format object task pane 205 is illustrated docked to an edge of an application window 110. Providing formatting controls within a task pane 205 docked along an edge may provide a formatting user interface (UI) that does not obscure objects 120,130,140 or document workspace 115. Embodiments may promote a modeless workflow in which users may perform multiple formatting tasks on multiple objects 120,130,140 in sequence without having to dismiss and relaunch the UI. According to an embodiment, the format object task pane 205 may be docked to an edge of an application window 110 by default; however, a user may choose to move the task pane 205 so that it may be dragged over a document 115 or, if a user has multiple monitors, the task pane 205 may be dragged to another screen.

Figure 3:
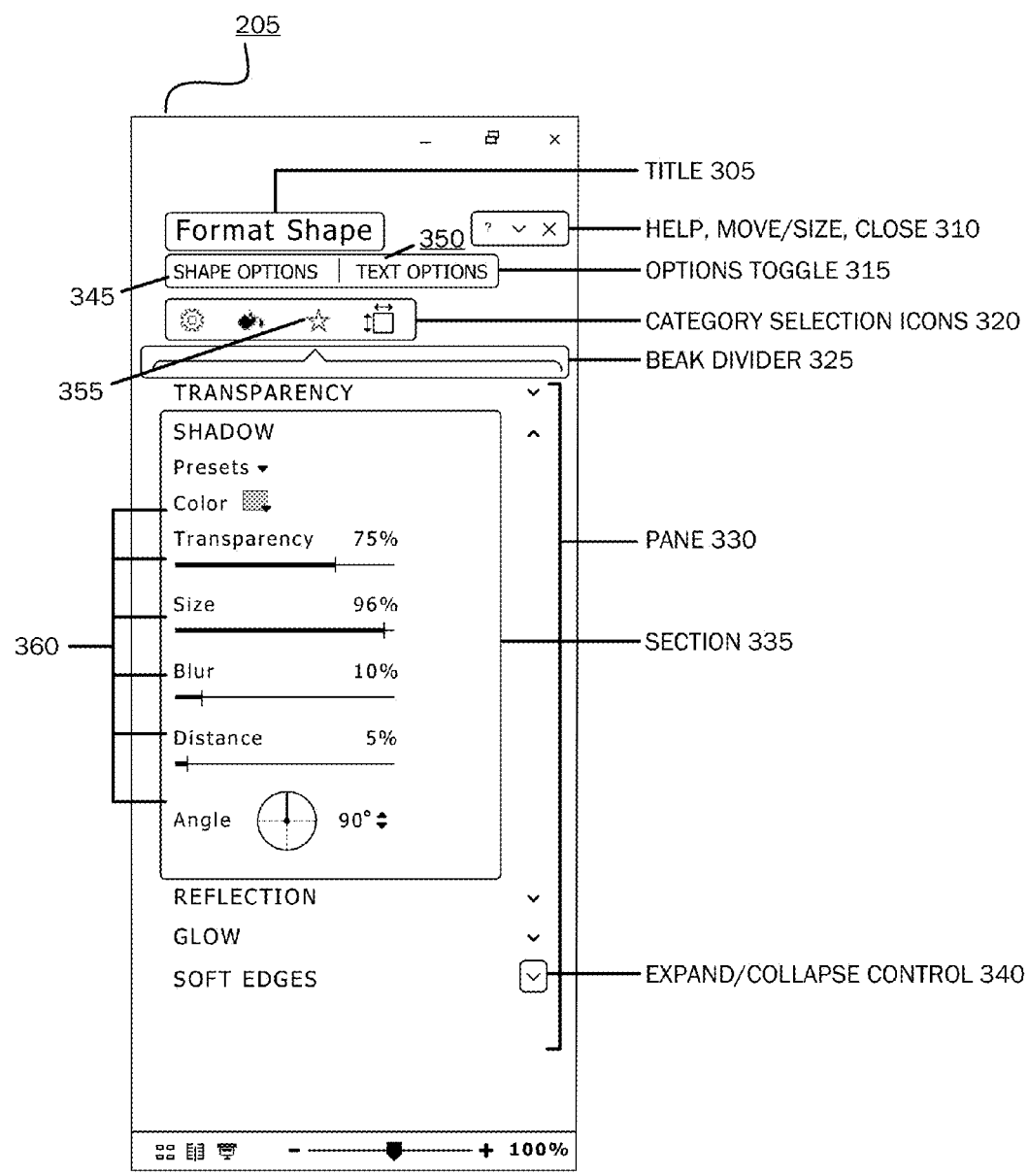
FIG. 3 is an illustration of UI components of a format object task pane.

Referring now to FIG. 3, UI components of a format object task pane 205 are illustrated. As illustrated, a format object task pane 205 may comprise a title 305. The title 305 may reflect a type of object that is selected. For example, if a shape is selected, the title 305 may read "Format Shape." Alternatively, if text is selected, the title 305 may read "Format Text." If a chart object 130 is selected, the title 305 may reflect the chart element type that is selected, as opposed to the chart. For example, if a trendline inside a chart 130 is selected, the title 305 may read "Format Trendline."

Functionality controls, such as a help, move/size, and close controls 310, may be provided. A help control may launch a user to an appropriate help article depending on what item is either selected using a pointing and selection device (e.g., mouse) or given focus by navigating to the item using a keyboard. Move/size and close controls may be provided. The move/size control may be utilized to reposition and resize the task pane 205. The task pane 205 may be resized via other methods such as by placing a cursor on an undocked edge of the pane, which may yield a resize cursor for dragging the edge of the pane to the desired size/position. The close control may be utilized to close the task pane 205.

Oftentimes, users want to format an object 120,130,140 and the text 145 associated with the object. For example, a user may select a shape 140, the shape containing text 145 inside the shape. The user may want to format attributes of the shape 140 (e.g., line color, line thickness, fill color, shadow, etc.) and also to format the text 145 (e.g., font type, font color, font size, etc.). Current methods provide for two separate dialogs 125 for formatting. One dialog is provided for object formatting, and a separate dialog is provided for text formatting. These dialogs 125 may be mutually exclusive and may have different launch points. A user wanting to switch between object and text formatting may be required to relaunch the dialog 125 each time he/she wants to switch between the two sets of formatting controls.

Embodiments of the present invention provide for combining object and text properties into one modeless task pane 205. Referring still to FIG. 3, an options toggle 315 may be provided for toggling between object types. According to one embodiment, the options toggle 315 may be provided for toggling between object formatting controls and text formatting controls. The options toggle 315 may be comprised of two selectable text strings: "shape options" 345 and "text options" 350, which when selected may toggle between the two sets of formatting controls. According to embodiments, when the toggle state of the options toggle 315 is in the "shape options" state 345, formatting controls 360 that apply to a selected object 140 may be displayed in the format object task pane 205. When the toggle state of the options toggle 315 is in the "text options" state 350, formatting controls 360 that apply to the text 145 associated with the selected object 140 may be displayed. When in the "text options" state 350, formatting may occur contextually based on what a user a selected. If an object is selected 140, all of the text 145 associated with the object may be formatted. If text or a portion of text 145 is selected, only the selected text may be formatted.

Contextual behavior of the format object task pane 205 may apply to text and can trigger a toggle state switch. For example, if a user enters text edit mode for text 145 associated with a selected object 140, the task pane 205 may automatically switch to the text options state 350.

Not all objects may have text associated with them (e.g., a picture). According to embodiments, if an object 120 is selected that does not have text associated with it, the options toggle 315 may be hidden from the format object task pane 205. Conversely, if text 145 is selected and object options do not exist (e.g., text in a word processing document), the options toggle 315 may be hidden from the format object task pane 205.

According to another embodiment, the options toggle 315 may be provided for toggling between marker and line formatting controls. The options toggle 315 for toggling between marker and line formatting controls may be contextual in that it may be displayed only when a selected object is of a type that can have markers.

A plurality of category selection icons 320 may be provided. Each category selection icon 320 may represent a category of formatting controls 360. Upon selection of an icon 320, an associated category of formatting controls 360 may be displayed in the task pane 205. For example and as illustrated in FIG. 3, an "effects" icon 355 has been selected, and formatting controls 360 associated with effect may appear in the pane 330. According to embodiments, the pane 330 may be an area of the format object task pane 205 where formatting controls 360 are housed. If there are more functionality controls 360 than can fit within the pane 330 on a screen, a vertical scroll bar may be displayed. According to embodiments, content within the pane 330 may scroll; UI elements above the pane (e.g., title 305, help, move/size, close controls 310, options toggle 315, category selection icons 320, etc.) may remain static and unaffected by scrolling. As can be appreciated, different object types may have different formatting options. Accordingly, the category selection icons 320 that appear in the format object task pane 205 may vary depending on the object 120, 130, 140 that is selected and depending on the toggle state 345,350 of the format object task pane. Icons that represent applicable and active formatting controls may appear. According to embodiments, icons that are not applicable may not be displayed in the format object task pane as grayed out/faded non-selectable icons. That is, only applicable and active formatting controls may be displayed.

A visual UI element, such as a beak divider 325 may be provided for reinforcing a relationship between a selected icon 355 in the category selection icons 320 section and the controls in the pane 330 below. As illustrated, the beak divider 325 may point to a currently selected icon 355.

Within each category, there may be multiple sections 335 of formatting controls 360. Each section 335 may represent a group of related controls formatting 360. As illustrated in the example format object task pane 205 in FIG. 3, the "effects" category 355 is active, and five sections 335 of formatting controls 360 are displayed in the pane 330. Each section 335 is provided for each effect type (e.g., transparency, shadow, reflection, glow, and soft edges). Embodiments may provide for expand/collapse controls 340 for providing expand/collapse functionality to each section 335 of controls 360.

Figure 4:
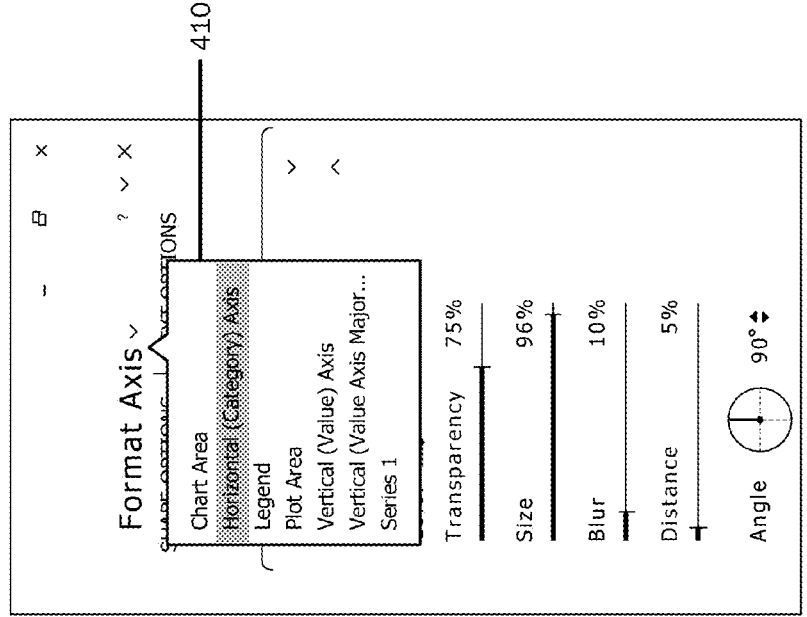
FIG. 4 is an illustration of a chart element selector trigger within a format object task pane.
Figure 4:
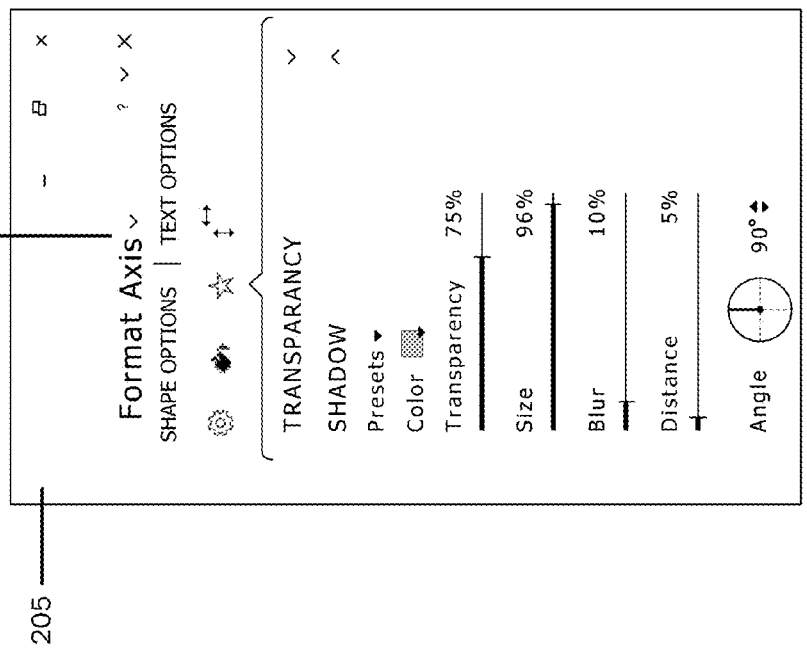

Referring now to FIG. 4, embodiments may provide for a chart element selector trigger 405. Current methods for selecting chart elements for formatting are oftentimes difficult for users due to narrow/fine chart elements. Embodiments of the present invention provide for a chart element selector trigger 405 for allowing users to select an individual chart element on a selected chart 130. As illustrated in FIG. 4, the chart element selector trigger 405 may be a caret icon, which when selected may trigger a drop down list 410 of chart elements. Selecting a chart element from the list 410 may cause the chart element to be selected in the document 115. The format object task pane 205 may update to reflect the newly selected chart element. As should be appreciated, although shown as a caret icon, the chart element selector trigger 405 may be represented by one of a vast number of UI controls.

Figure 5:
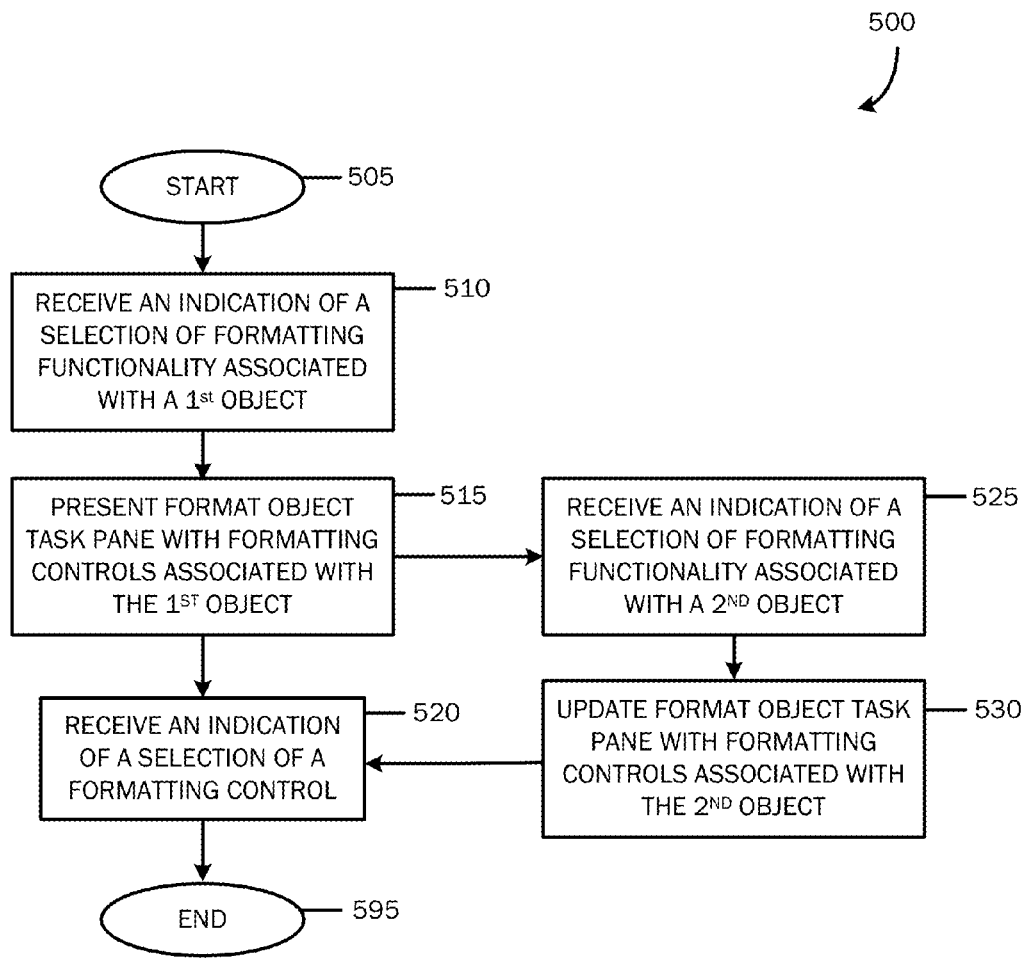
FIG. 5 is a process flow diagram illustrating an example process of providing formatting functionalities in a modeless task pane.

FIG. 5 is a flow diagram illustrating a process 500 of providing formatting functionalities in a modeless task pane 205. The method 500 starts at OPERATION 505 and proceeds to OPERATION 510 where an indication of a selection of formatting functionality is received. According to embodiments, a selection of formatting functionality may be an activation of one of various entry points including, but not limited to, selection of a formatting option in a user interface toolbar, selection via a context menu; selection via a dialog, selection via a double-clicking of a chart element, or selection via object oriented user interface features. The selection of formatting functionality may be in associated with a selected object 120,130,140,145.

Upon receiving an indication of a selection of formatting functionality (510), formatting controls 360 associated with the selected object 120,130,140,145 may be provided in a format object task pane 205 (515). For example, a format object task pane 205 may be displayed upon receiving an indication of a right-clicking on a shape object 140 and a selection of a "format" functionality. Formatting controls 360 organized by categories (e.g., fill, line, effects, layout, etc.) and sections 335 within categories (e.g., within an effects category: shadow, reflection, glow, soft edges, 3D format, 3D rotation, etc.) associated with formatting a shape 140 may be provided in the format object task pane 205. As described above, the format object task pane 205 may be a modeless task pane, and may be docked to an edge of an application window 110. Formatting controls 360 may be grouped so that common tasks and workflows are grouped together. Object formatting controls and text formatting controls may be provided in the format object task pane 205. An options toggle 315 may be provided for toggling between object formatting controls and text formatting controls.

According to embodiments, when the format object task pane 205 is triggered from an entry point that maps to a particular section 335 within a pane 330 (e.g., launching to a "shadow" section of an "effects" category via selection of "shadow options" in a user interface toolbar), the appropriate pane 330 and section 335 may be opened in the format object task pane 205. Additionally, the pane 330 may be scrolled such that the applicable section 335 may appear at the top of the format object task pane 205. Formatting controls 360 that cannot be used at a given time given a user's selection (i.e., disabled controls) may not be displayed.

According to embodiments, sections 335 and formatting controls 360 in each category may be dynamic and based on a type of element selected (e.g., chart 130), a subtype of element selected (e.g., a horizontal (category) axis of a chart 130), and a selection of an individual option inside of the format object task pane 205 (e.g., picture tiling formatting controls may appear if the picture tiling option is selected).

At OPERATION 520, an indication of a selection of a formatting control 360 may be received. For example, a user may select one or more formatting controls 360 for customizing an object such as a picture 120, chart 130, shape 140, line, text, or text associated with an object, chart, or shape.

At OPERATION 525, an indication of a selection of a formatting functionality associated with a second object may be received. The second object may be one of a picture 120, chart 130, shape 140, line, text, or text associated with an object, chart, or shape. The selection of the formatting functionality may be an activation of the format object task pane 205 via one of various entry points as described with respect to OPERATION 510.

At OPERATION 530, the format object task pane 205 may be automatically updated with formatting controls 360 associated with the second object. For example, a user may right-click on a shape and select format, and formatting controls 360 associated with formatting a shape may be displayed in the format object task pane 205. The user may then right-click on a trendline in a chart 130, and the format object task pane 205 may automatically update to show trendline formatting controls 360. The user may then select a formatting control 360 to format a selected object 120, 130,140,145 (520). The method ends at OPERATION 595. As can be appreciated, a user may select a plurality of objects 120,130,140,145 to format.

Figure 6:
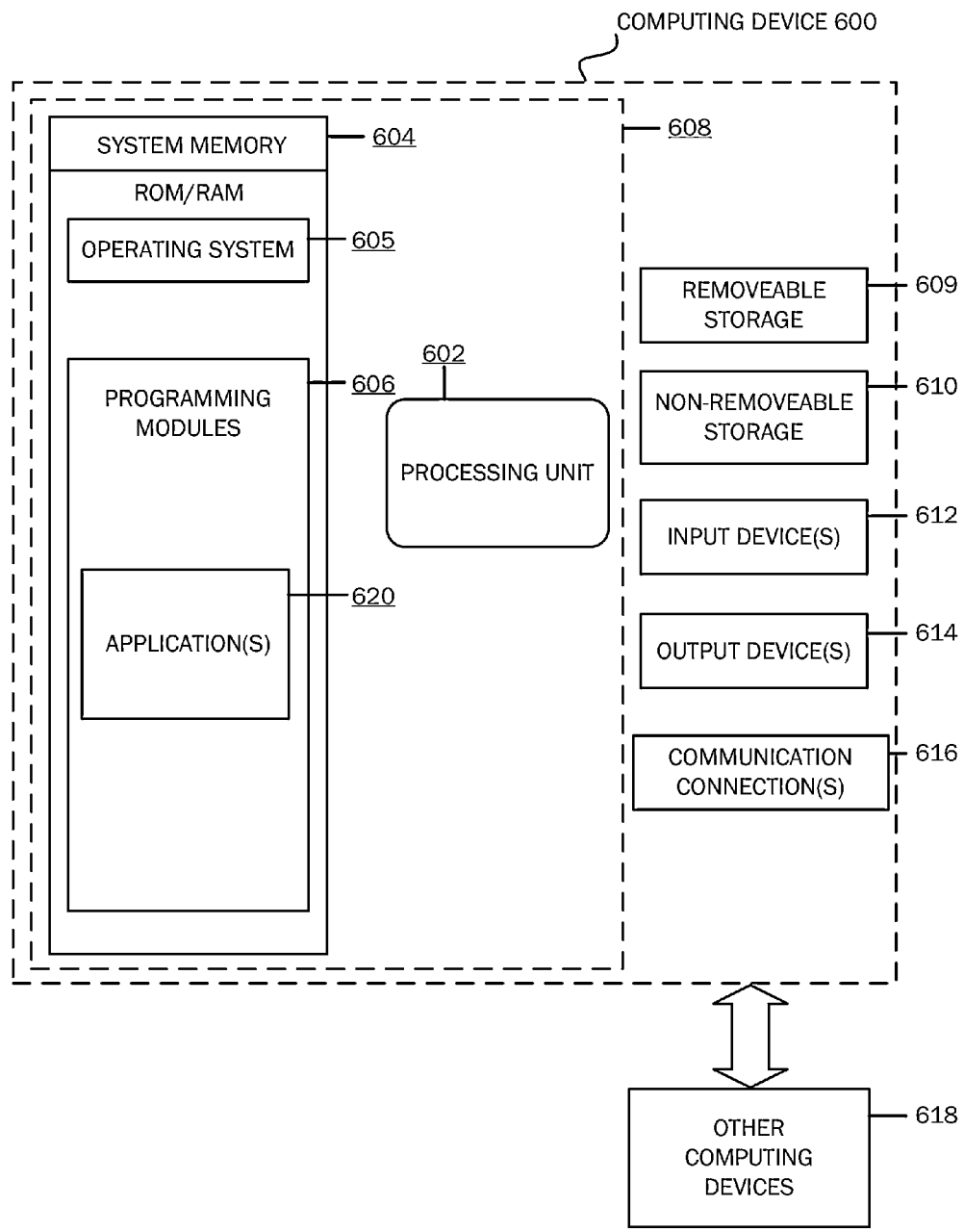
FIG. 6 is a block diagram illustrating example physical components of a computing device with which embodiments of the invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating example physical components of a computing device 600 with which embodiments of the invention may be practiced. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include one or more applications 620. For example, the one or more applications 620 may include, but is not limited to, a word processing application, a spreadsheet application, a database application, an email application, a slideshow presentation application, a web design application, a drawing application, etc. Operating system 605, for example, may be suitable for controlling computing device 600's operation. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computing device 600 may also contain a communication connection 616 that may allow device 600 to communicate with other computing devices 618, such as over a network in a distributed computing environment, for example, an intranet or the Internet. Communication connection 616 is one example of communication media.

As stated above, a number of program modules and data files may be stored in system memory 604, including operating system 605. While executing on processing unit 602, programming modules 606, such as an application 620 may perform processes including, for example, one or more method 500's operations as described above. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to application 620 may be operated via application-specific logic integrated with other components of the computing device/system 600 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
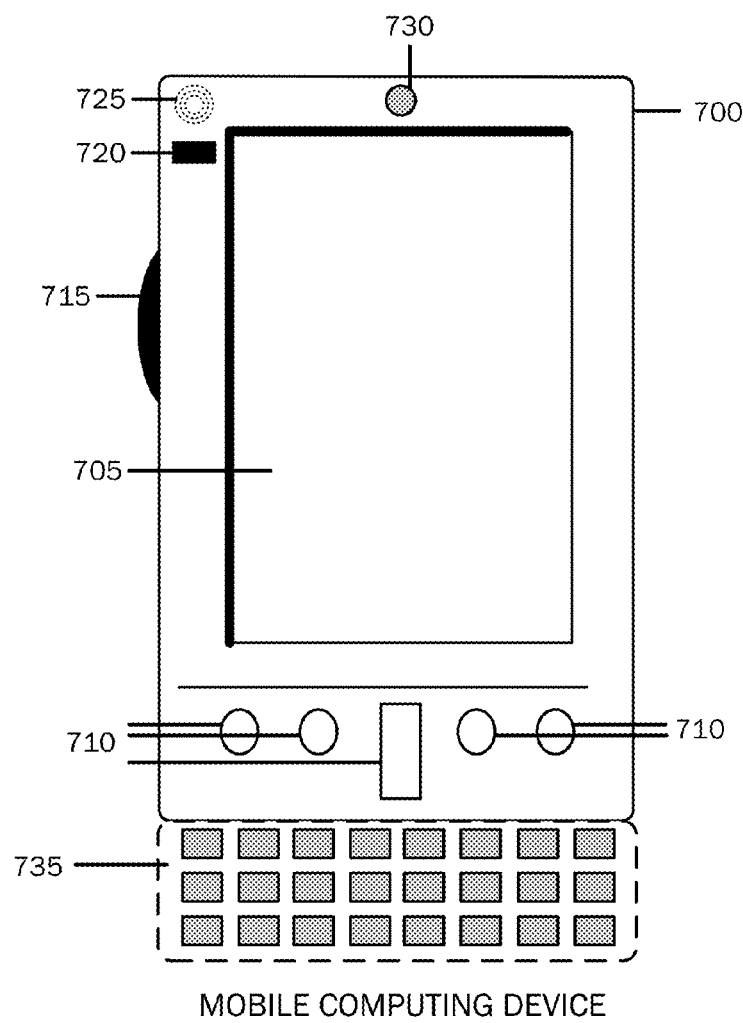
FIGS. 7A and 7B are simplified block diagrams of a mobile computing device with which embodiments of the present invention may be practiced.
Figure 7B:
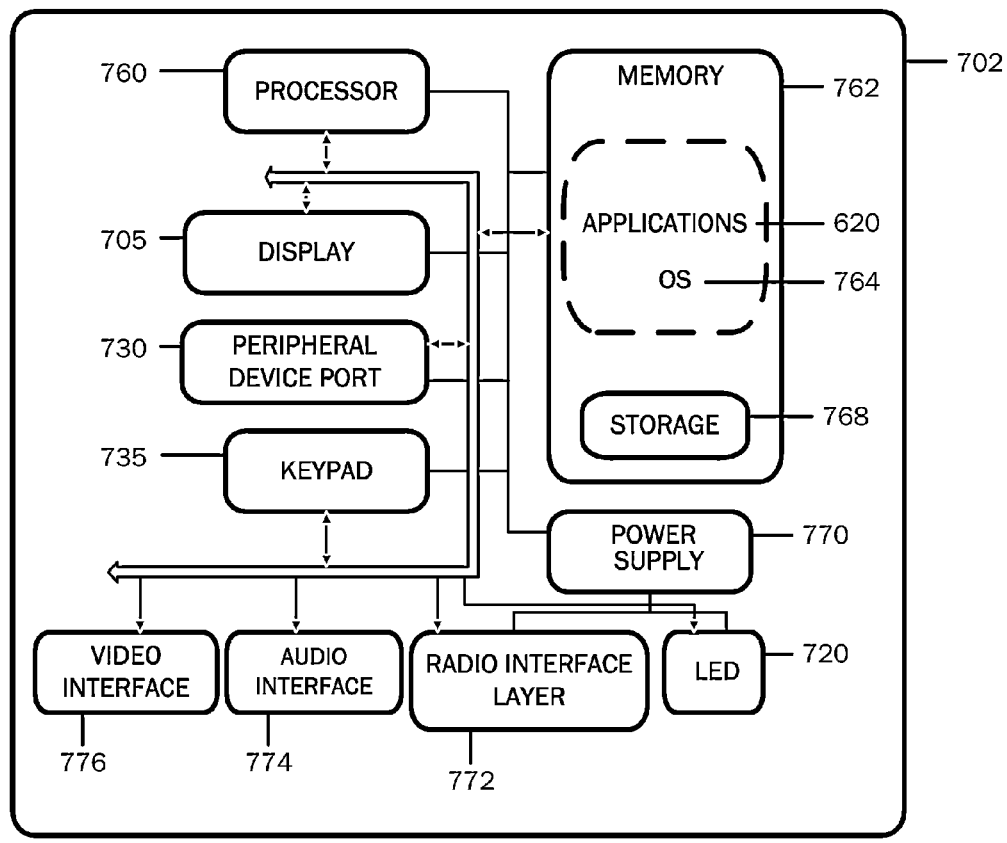
Figure 8:
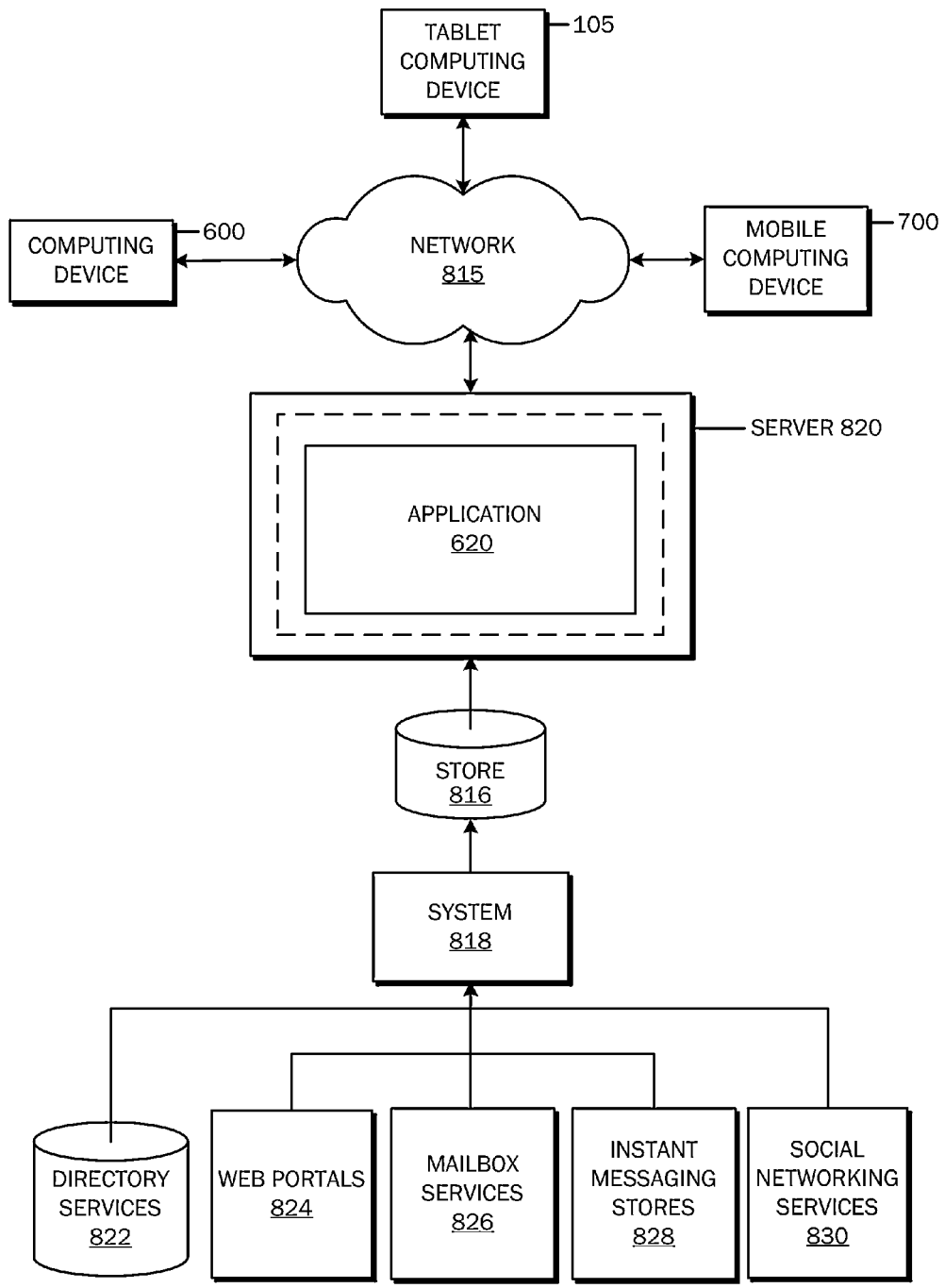
FIG. 8 is a simplified block diagram of a distributed computing system in which embodiments of the present invention may be practiced.

FIGS. 7A and 7B illustrate a suitable mobile computing environment, for example, a mobile telephone 700, a smartphone, a tablet personal computer, a laptop computer, and the like, with which embodiments of the invention may be practiced. With reference to FIG. 7A, an example mobile computing device 700 for implementing the embodiments is illustrated. In a basic configuration, mobile computing device 700 is a handheld computer having both input elements and output elements. Input elements may include touch screen display 705 and input buttons 710 that allow the user to enter information into mobile computing device 700. Mobile computing device 700 may also incorporate an optional side input element 715 allowing further user input. Optional side input element 715 may be a rotary switch, a button, or any other type of manual input element. In alternative embodiments, mobile computing device 700 may incorporate more or less input elements. For example, display 705 may not be a touch screen in some embodiments. In yet another alternative embodiment, the mobile computing device is a portable phone system, such as a cellular phone having display 705 and input buttons 715. Mobile computing device 700 may also include an optional keypad 735. Optional keypad 735 may be a physical keypad or a "soft" keypad generated on the touch screen display.

Mobile computing device 700 incorporates output elements, such as display 705, which can display a graphical user interface (GUI). Other output elements include speaker 725 and LED light 720. Additionally, mobile computing device 700 may incorporate a vibration module (not shown), which causes mobile computing device 700 to vibrate to notify the user of an event. In yet another embodiment, mobile computing device 700 may incorporate a headphone jack (not shown) for providing another means of providing output signals.

Although described herein in combination with mobile computing device 700, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices.

FIG. 7B is a block diagram illustrating components of a mobile computing device used in one embodiment, such as the computing device shown in FIG. 7A. That is, mobile computing device 700 can incorporate system 702 to implement some embodiments. For example, system 702 can be used in implementing a "smart phone" that can run one or more applications similar to those of a desktop or notebook computer such as, for example, browser, e-mail, scheduling, instant messaging, and media player applications. In some embodiments, system 702 is integrated as a computing device, such as an integrated personal digital assistant (PDA) and wireless phone.

One or more application programs 620 may be loaded into memory 762 and run on or in association with operating system 764. Examples of application programs include phone dialer programs, e-mail programs, PIM (personal information management) programs, electronic mail and contacts applications, word processing applications, spreadsheet applications, database applications, slide presentation applications, drawing or computer-aided application programs, messaging programs, and so forth. System 702 also includes non-volatile storage 768 within memory 762. Non-volatile storage 768 may be used to store persistent information that should not be lost if system 702 is powered down. Applications 620 may use and store information in non-volatile storage 768, such as e-mail or other messages used by an e-mail application, and the like. A synchronization application (not shown) also resides on system 702 and is programmed to interact with a corresponding synchronization application resident on a host computer to keep the information stored in non-volatile storage 768 synchronized with corresponding information stored at the host computer. As should be appreciated, other applications may be loaded into memory 762 and run on the device 700.

System 702 has a power supply 770, which may be implemented as one or more batteries. Power supply 770 might further include an external power source, such as an AC adapter or a powered docking cradle that supplements or recharges the batteries.

System 702 may also include a radio 772 that performs the function of transmitting and receiving radio frequency communications. Radio 772 facilitates wireless connectivity between system 702 and the "outside world", via a communications carrier or service provider. Transmissions to and from radio 772 are conducted under control of OS 764. In other words, communications received by radio 772 may be disseminated to application programs 620 via OS 764, and vice versa.

Radio 772 allows system 702 to communicate with other computing devices, such as over a network. Radio 772 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 702 is shown with two types of notification output devices; LED 720 that can be used to provide visual notifications and an audio interface 774 that can be used with speaker 725 to provide audio notifications. These devices may be directly coupled to power supply 770 so that when activated, they remain on for a duration dictated by the notification mechanism even though processor 760 and other components might shut down for conserving battery power. LED 720 may be programmed to remain on indefinitely until the user takes action to indicate the powered-on status of the device. Audio interface 774 is used to provide audible signals to and receive audible signals from the user. For example, in addition to being coupled to speaker 725, audio interface 774 may also be coupled to a microphone to receive audible input, such as to facilitate a telephone conversation. In accordance with embodiments of the present invention, the microphone may also serve as an audio sensor to facilitate control of notifications, as will be described below. System 702 may further include video interface 776 that enables an operation of on-board camera 730 to record still images, video stream, and the like.

A mobile computing device implementing system 702 may have additional features or functionality. For example, the device may also include additional data storage devices (removable and/or non-removable) such as, magnetic disks, optical disks, or tape. Such additional storage is illustrated in FIG. 7B by storage 768. Computer storage media may include volatile and nonvolatile, removable and non-removable media implemented in any method or technology for storage of information, such as computer readable instructions, data structures, program modules, or other data.

Data/information generated or captured by the device 700 and stored via the system 702 may be stored locally on the device 700, as described above, or the data may be stored on any number of storage media that may be accessed by the device via the radio 772 or via a wired connection between the device 700 and a separate computing device associated with the device 700, for example, a server computer in a distributed computing network, such as the Internet. As should be appreciated such data/information may be accessed via the device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates a system architecture for providing contextual formatting controls, as described above. Content developed, interacted with or edited in association with an application 620 may be stored in different communication channels or other storage types. For example, various content items along with information from which they are developed may be stored using directory services 822, web portals 824, mailbox services 826, instant messaging stores 828 and social networking sites 830. A system 818 may use any of these types of systems or the like for providing contextual formatting controls in a format object task pane 205, as described herein. A server 820 may receive requests to run an application 620 and pass items to clients. As one example, server 820 may be a web server providing content over the web. Server 820 may provide content over the web to clients through a network 815. Examples of clients that may obtain content include computing device 600, which may include any general purpose personal computer, a tablet computing device 105 and/or mobile computing device 700 which may include smart phones. Any of these devices may obtain content from the store 816.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing formatting controls in a format object task pane in an application, the method comprising:
   receiving a request for a formatting functionality;
   in response to receiving the request, presenting a format object task pane, wherein the format object task pane is mode less to thereby enable performance of formatting tasks on multiple objects without having to dismiss and relaunch the format object task pane and the format object task pane is presented within an application window such that the format object task pane does not obstruct a document workspace;
   receiving a selection of a first object displayed in the document workspace of the application, wherein the first object is of a first object type and in response to the selection of the first object,
   displaying in the format object task pane a first set of formatting controls that are applicable to the first object type;
   receiving a selection of a second object displayed in the document workspace of the application, wherein the second object is different from the first object and is of a second object type, and in response to the selection of the second object, displaying in the format object task pane a second set of formatting controls that are applicable to the second object type; and
   receiving a selection of a third object displayed in the document workspace of the application, wherein the third object is different from the first object and the second object, and wherein the third object comprises both the first object type and the second object type, and in response to a selection of the third object, initially displaying in the format object task pane the first set of formatting controls and an options toggle that is operable to replace display of the first set of formatting controls with display of the second set of formatting controls in the format object task pane upon selection.

2. The method of claim 1, wherein the first object type and the second object type are selected from two distinct types of object types including a picture, chart, shape, line, text, or text associated with an object, chart, or shape.

3. The method of claim 1, wherein the first set of formatting controls comprises object formatting controls and the second set of formatting controls comprises text formatting controls.

4. The method of claim 3, further comprising organizing one or more of the first set of formatting controls and the second set of formatting controls into categories.

5. The method of claim 1, wherein receiving the request for the formatting functionality includes receiving an indication of a selection of a formatting entry point.

6. The method of claim 5, further comprising presenting the format object task pane after receiving the request for the formatting entry point mapping to a particular section within a pane.

7. The method of claim 6, further comprising presenting the format object task pane opened to the particular section in the pane.

8. The method of claim 1, wherein presenting the format object task pane includes presenting the format object task pane docked along an edge of the application window.

9. The method of claim 1, wherein the format object task pane is presented comprising one or more formatting controls associated with a selected chart, and further comprising providing a chart element selector trigger for providing a selection of individual chart elements on the selected chart.

10. The method of claim 1, wherein the first set of formatting controls or the second set of formatting controls that is currently displayed in the format object task pane continues to be displayed within the format object task pane in response to receiving a selection associated with a fourth object.

11. The method of claim 1, wherein the options toggle is hidden from the format object task pane when a single object type is selected.

12. A system for providing formatting controls in a format object task pane, comprising:
a processing unit; and
a memory including an application operative to:
receive a selection of a first object displayed in a document workspace of the application;
determine an object type of the first object from a first object type and a second object type;
receive a request for a formatting functionality associated with the first object;
in response to receiving the request, present a format object task pane, wherein the format object task pane is non-modal to thereby enable performance of formatting tasks on multiple objects without having to dismiss and relaunch the format object task pane, wherein the format object task pane is presented within the application such that the format object task pane does not obstruct the document workspace;
wherein when it is determined that the first object is of the first object type:
display in the format object task pane a first set of formatting controls;
wherein when it is determined that the first object is of the second object type:
display in the format object task pane a second set of formatting controls;
wherein when it is determined that the first object is of the first object type and the second object type:
display in the format object task pane the first set of formatting controls and a second toggle that is operable to replace display of the second set of formatting controls with display of the first set of formatting controls;
receive a selection of the second toggle; and
in response to receiving the selection of the second toggle, display in the format object task pane the second set of formatting controls and a first toggle that is operable to replace display of the second set of formatting controls with display of the first set of formatting controls.

13. The system of claim 12, wherein the second toggle further comprising an options toggle for toggling between a presentation of object formatting controls and text formatting controls.

14. The system of claim 12, wherein the application is further operable to:
receive a selection of a second object;
in response to receiving the selection of the second object, determine an object type of the second object from the first object type and the second object type; and
automatically update the format object task pane to display the first set of formatting controls or the second set of formatting controls based on the object type.

15. The system of claim 14, wherein the first set of formatting controls and the second set of formatting controls include different contextual formatting controls associated with a picture, a chart, a shape, a line, text, or text associated with an object, chart, or shape.

16. A computer readable storage device that is not a signal and contains computer-executable instructions which when executed by a computer perform a method for providing formatting controls in a format object task pane, the method comprising:
presenting a document within an application window;
receiving a selection of a first object in the document, the first object including a picture, a chart, a shape, a line, document text, or text associated with another object;
determining an object type of the first object between a first object type and a second object type;
receiving a request for a formatting functionality associated with the first object;
in response to receiving the request, presenting format object task pane initially displaying either a first set of contextual formatting controls when it is determined that the first object is of the first object type or a second set of contextual formatting controls when it is determined that the first object is of the second object type or the first set of contextual formatting controls and a second toggle when it is determined that the first object is of the first object type and the second object type, wherein the selection of the second toggle causes the format object task pane to display the second set of contextual formatting controls and a first toggle, wherein selection of the first toggle causes the format object task pane to display the first set of contextual formatting controls, and wherein the first set of contextual formatting controls and the second set of contextual formatting controls are not displayed contemporaneously with each other;

receiving a selection of a second object in the document, the second object including a picture, a chart, a shape, a line, document text, or text associated with another object;

determining an object type of the second object between the first object type and the second object type;

automatically updating the format object task pane to display either the first set of contextual formatting controls when it is determined that the second object is of the first object type or the second set of contextual formatting controls when it is determined that the second object is of the first object type; and wherein the format object task pane is modeless and thereby operable to perform formatting tasks on multiple objects without having to dismiss and relaunch the format object task pane.

17. The computer readable storage device of claim 16, wherein receiving the request for the formatting functionality includes receiving selection of a formatting entry point mapping to a particular section within a pane, and presenting the format object task pane opened to the particular section in the pane.

18. The computer readable storage device of claim 16, wherein one or more contextual formatting controls of the first set of contextual formatting controls that are associated with the first object type but that are not applicable to the first object are displayed but indicated as non-selectable icons.

* * * * *